(12) United States Patent
Pett et al.

(10) Patent No.: US 8,154,435 B2
(45) Date of Patent: Apr. 10, 2012

(54) STABILITY MONITORING USING SYNTHETIC APERTURE RADAR

(75) Inventors: Todd Pett, Longmont, CO (US); John D. Paden, Boulder, CO (US); John Curlander, Boulder, CO (US); Lawrence Brewster, Superior, CO (US); Malcolm William Ashby, II, Broomfield, CO (US); Xiaoqing Wu, Superior, CO (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/196,307

(22) Filed: Aug. 22, 2008

(65) Prior Publication Data

US 2010/0045513 A1 Feb. 25, 2010

(51) Int. Cl.
*G01S 13/00* (2006.01)
(52) U.S. Cl. .................... 342/25 R; 342/25 A; 342/176; 342/190
(58) Field of Classification Search .................... 342/25, 342/25 R, 25 A, 176, 190
See application file for complete search history.

(56) References Cited

U.S. PATENT DOCUMENTS

| 5,552,787 | A | * | 9/1996 | Schuler et al. .............. 342/25 A |
| 6,011,505 | A | | 1/2000 | Poehler et al. |
| 6,150,972 | A | | 11/2000 | Bickel et al. |
| 6,567,567 | B1 | * | 5/2003 | Levin et al. .................... 382/284 |
| 6,677,885 | B1 | * | 1/2004 | Frankot ........................ 342/25 R |
| 6,741,202 | B1 | | 5/2004 | Krikorian et al. |
| 6,911,931 | B2 | | 6/2005 | Vincent |
| 6,943,724 | B1 | | 9/2005 | Brace et al. |
| 7,145,497 | B2 | | 12/2006 | Krikorian et al. |
| 2003/0071750 | A1 | * | 4/2003 | Benitz .............................. 342/25 |
| 2004/0118313 | A1 | * | 6/2004 | Temes et al. .................. 102/498 |
| 2005/0057391 | A1 | * | 3/2005 | Forsley et al. .............. 342/25 A |
| 2006/0020218 | A1 | * | 1/2006 | Freeman et al. .............. 600/509 |
| 2006/0022991 | A1 | * | 2/2006 | Scheepers et al. ............ 345/582 |
| 2006/0271302 | A1 | * | 11/2006 | Ehrlich ........................... 702/19 |
| 2008/0118118 | A1 | * | 5/2008 | Berger .......................... 382/128 |
| 2008/0169966 | A1 | * | 7/2008 | Tsuchihashi et al. .......... 342/70 |
| 2009/0121926 | A1 | * | 5/2009 | Iverson ........................ 342/25 B |

FOREIGN PATENT DOCUMENTS

WO 200054006 A3 1/2001
WO WO 2007009175 A1 * 1/2007

OTHER PUBLICATIONS

Vasile et al, Intensity-Driven Adaptive-Neighboring Technique for Polarimetric and Interferometric SAR Parameters Estimation, Jun. 2006, IEEE Transaction on Geosience and remote sensing, vol. 44, No. 6.*

(Continued)

*Primary Examiner* — Timothy A Brainard
(74) *Attorney, Agent, or Firm* — Boswell IP Law; J. Mason Boswell

(57) ABSTRACT

A stability monitoring system is described that provides an accurate, automated, and remote way of monitoring small movements over a large surface area without the need to pre-place reflective targets using a mobile SAR. The stability monitoring system allows the rapid, automated identification and measurement of small surface movements over a wide field of view from a safe standoff distance without the need for personnel working in hazardous zones. Using this data, authorities can more accurately identify hazard areas and efficiently allocate mitigation resources.

20 Claims, 11 Drawing Sheets

OTHER PUBLICATIONS

Wang, Y. ; Zhou, L.-F. ; Liang, X.-D. ; Li, D.-J., A Reconfigurable, Scalable and Multifunctional Experimental AutoSAR and Its Applications, Aug. 2006, Geoscience and Remote Sensing Symposium, 2006. IGARSS 2006. IEEE International Conference on, 3044.*

Weeks, et al., "Application of Synthetic Aperture Radar Interferometry (InSAR) in Defining Mine-Related Ground Deformation and Subsidence Hazards", retrieved at <<http://www.azdot.gov/Highways/Materials/Geotech_Design/Seminar/PDF/InSAR_Weeks.pdf>>, pp. 11.

Smith, Laurence C., "Emerging Applications of Interferometric Synthetic Aperture Radar (InSAR) in Geomorphology and Hydrology", retrieved at <<http://www.sscnet.ucla.edu/geog/downloads/297/164.pdf>>, Association of American Geographers, 92(3), 2002, pp. 385-398.

Wang, et al., "A Study of Surface Deformation from Earthquake by Differential Radar Interferometry", retrieved at <<http://www.gisdevelopment.net/aars/acrs/2000/ts17/aima0008.asp>>, Jun. 23, 2008, pp. 4.

Oppliger, Gary L , "An Interferometric Synthetic Aperture Radar (InSAR) research capability for developing integrated groundwater-monitoring methods", retrieved at <<http://www.unr.edu/spacegrant/epscor/Documents/Oppliger.pdf>>, pp. 9.

Fortuny, et al., "Fast Algorithm for Near-Field Synthetic Aperture Radar Processor", retrieved at <<http://ieeexplore.ieee.org/ie14/8/7695/00320756.pdf?tp=&isnumber=&arnumber=320756>>, IEEE Transactions on Antennas and Propagation, vol. 42. No. 10, October 1994, pp. 3.

Marechal, Nick, "Tomographic Formulation of Interferometric SAR for Terrain Elevation Mapping", retrieved at http://ieeexplore.ieee.org/iel1/36/8788/00387588.pdf>>, IEEE Transactions on Geoscience and Remote Sensing, vol. 33, No. 3, May 1995, pp. 14.

Massonnet, et al., "Radar Interferometry: Limits and Potential", retrieved at <<http://ieeexplore.ieee.org/iel1/36/5611/00214922.pdf>>, 1EE.E TKANSAC TI( NS on Geoscience and Remote Sensing. vol. 31, No. 2, Mar. 1993, pp. 10.

Schwabisch, et al., "X-SAR Interferometry: First Results", retrieved at <<http://ieeexplore.ieee.org/iel1/36/9135/00406681.pdf>>IEEE Transactions on Geoscience and Remote Sensing. vol. 33, No. 4, Jul. 1995, pp. 950-956.

Rudolf, et al., "Combination of Linear and Circular SAR for 3-D Features", retrieved at <<http://ieeexplore.ieee.org/ iel3/4810/13305/00608939.pdf, 1997 IEEE, pp. 3.

Wiesbeck, et al., "Single Reference, Three Target Calibration for Monostatic, Polarimetric Free Space Measurements", retrieved at <<http://ieeexplore.ieee.org/iel1/5/3217/00104229.pdf?tp=&arnumber=104229&isnumber=3217>>, Proceedings of the IEEE, vol. 19, No. 10, Oct. 1991, pp. 1551-1558.

"Ground Probe", retrieved at <<http://www.groundprobe.com/slopestability.html>>, pp. 2.

"Gamma Remote Sensing", retrieved at <<http://www.gamma-rs.ch/rud/microwave-hardware.html>>, pp. 1.

* cited by examiner

STABILITY MONITORING USING SYNTHETIC APERTURE RADAR

BACKGROUND

Interferometric Synthetic Aperture Radar (InSAR) is a technique for using radar to measure displacements in objects. For example, InSAR has been used for topographic mapping, measuring ground displacements, and for measuring the stability of coal mines. Synthetic Aperture Radar (SAR) typically uses a radar antenna mounted to a moving platform to capture readings of phase and amplitude at different positions of the antenna with respect to an object. SAR can capture 2-dimensional (2D) or 3-dimensional (3D) information based on how the antenna is mounted. For example, one technique samples radar returns in the horizontal dimension by moving the antenna along a horizontal rail and vertical returns by moving the antenna along a vertical rail. Depth information is derived by range synthesis of the radar signal and bandwidth. The radar antenna transmits continuous waves or pulsed waveforms at each rail position, recording the return of the reflected signal at each position to create an image of the object. This configuration is used to capture an initial reference image of the object, and later to capture a second image after the object has changed or is suspected of changing. A pixel-by-pixel complex cross product of the two images produces an interferogram that highlights differences in the two images as changes in the phase of the reflected radar signal that are converted to displacements.

Transportation corridors and residential areas bordered by rock faces and steep slopes face a constant threat from rock fall and landslides. For example, rocks may fall onto a highway interfering with the use of the highway and possibly even causing injury. Department of transportation authorities in mountainous states are frequently faced with the daunting challenge of mitigating rock fall from steep canyon walls adjacent to busy highways. The identification of rock fall threat and its mitigation (e.g., stabilization of rock or its removal) is time critical to minimize any threat to traffic safety and to ensure that any mitigation activity is scheduled during low traffic periods to minimize flow disruptions.

In an attempt to mitigate these threats, transportation and municipal authorities typically rely upon in-situ techniques to ascertain the location and extent of the threat. For example, personnel typically scale the rock face or slope and manually check the conditions. These techniques are rudimentary and involve visual inspection of rock faces to identify coarse movements of rock face segments. Transportation authorities have applied optical measurements using reflective targets that workers install in advance at various places on the surface of the rock wall surface. For example, laser-based Electronic Distance Measurement (EDM) can be used to monitor various points on the rock face. However, such techniques lack displacement resolution and fail to provide a complete picture of the rock face with the potential to miss problem areas that are not specifically measured.

In addition, all of these techniques involve personnel working on the rock face or slope, and therefore are labor-intensive, time-consuming, and dangerous. Once the transportation authority decides to stabilize or scale (i.e. remove) rock from an area, trained personnel are then utilized to either climb up or rappel from the top of the wall to reach the hazard area. This process is often inaccurate, hazardous to maintenance personnel, time consuming, and expensive.

SUMMARY

A stability monitoring system using a mobile SAR is described that provides an accurate, automated, and remote way of monitoring small movements over a large surface area without the need to pre-place reflective targets. At a current measurement interval, the system captures radar information associated with a slope or other surface. The system applies SAR processing to the radar information to produce one or more SAR images. The system also retrieves radar information associated with the slope from a previous measurement interval. The system applies interferometry to the captured radar information from the current measurement interval and retrieved radar information from the previous measurement interval to produce interference maps indicative of movement of the slope over time. The interference maps are used to derive the displacement and digital elevation models. The system displays these products to an operator for determining if mitigation or other action regarding the slope is recommended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A stability monitoring system is described that provides an accurate, automated, and remote way of monitoring small movements over a large surface area without the need to pre-place reflective targets using a mobile SAR. The stability monitoring system allows the rapid, automated identification and measurement of small surface movements over a wide field of view from a safe standoff distance without the need for personnel working in hazardous zones. The measurements of small shifts, which are precursory indicators of rock fall or slides, allow the mitigation process to be specified and to proceed under safe, controlled conditions. The stability monitoring system provides the capability to measure small displacements (e.g., ~1 mm accuracy) over long periods through repeated measurements. This allows the computation of displacement rate of change over small resolution cells (e.g., pixels) providing authorities with a more complete and accurate picture of rock movement activity in a particular area. Using this data, authorities can more accurately identify hazard areas and efficiently allocate already strained mitigation resources.

Figure 1:
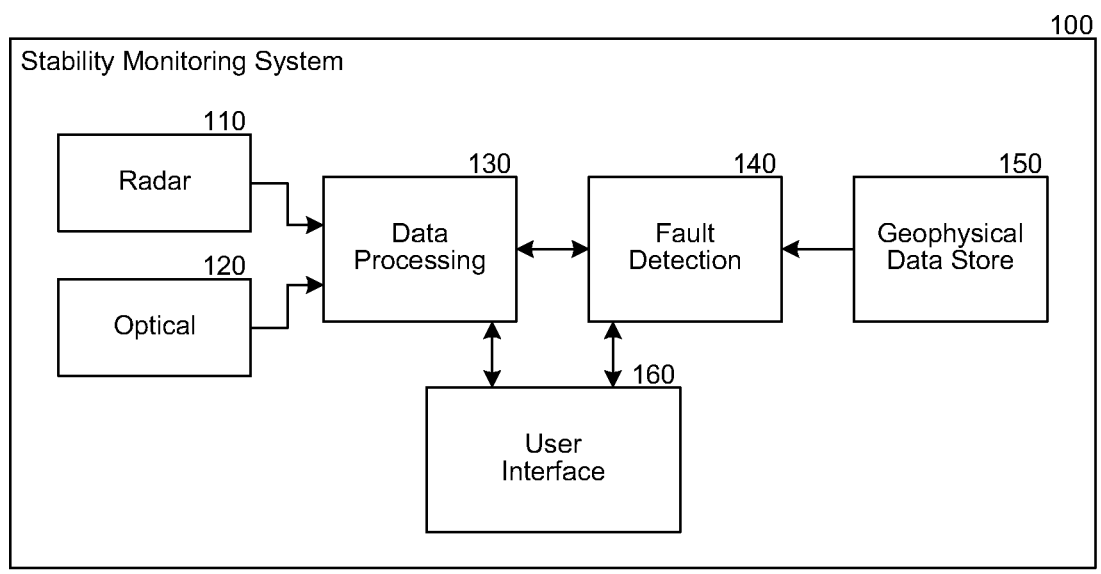
FIG. 1 is a block diagram that illustrates components of the stability monitoring system, in one embodiment.

FIG. 1 is a block diagram that illustrates components of the stability monitoring system, in one embodiment. The stability monitoring system 100 includes a radar component 110, an optical component 120, a data processing component 130, a fault detection component 140, a geophysical data store 150, and a user interface component 160. Each of these components is described in further detail herein.

The stability monitoring system 100 uses the radar component 110 and optional optical component 120 to collect data from the scene of interest and perform preliminary processing. For example, the radar component 110 may collect platform position information and raw phase history data and provide range-line pulse compression and filtering. The optical component 120 collects video or pictures of the scene of interest, and may collect information correlating the video or pictures with data from the radar component 110. For example, the system may overlay the radar data over the optical data to provide an operator of the system with additional context for the radar data.

The data processing component 130 receives the data from the radar component 110 and optical component 120 and completes any image processing of the data sources that was not performed by the respective components. The data processing component 130 may also receive operator control parameters from the user interface component 160 that specify or modify how the data is processed. The processing performed by the data processing component may include SAR processing the radar data, SAR image registration, interferogram generation, system error correction, digital elevation model (DEM) generation, displacement vector map generation, optical overlays, and so on.

The fault detection component 140 receives the DEM and displacement vector map from the data processing component 130 as well as historical data (e.g., previous datasets) and geophysical knowledge from the geophysical data store 150. Regions of interest or concern can be identified by the operator via the user interface component 160 and passed to the fault detection component 140. The fault detection component 140 uses these inputs to help identify fault regions in the scene and the type of fault or faults contained in the regions.

The user interface component 160 receives input from the user and displays results from the data processing component 130 and fault detection component 140 to the operator. The results may aid the operator in identifying faults and mitigation scenarios. The operator can also more easily see the change in a particular scene of interest over time. The user interface component 160 may consist of a display device, user input device, web interface, and other common methods of interacting with a user.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
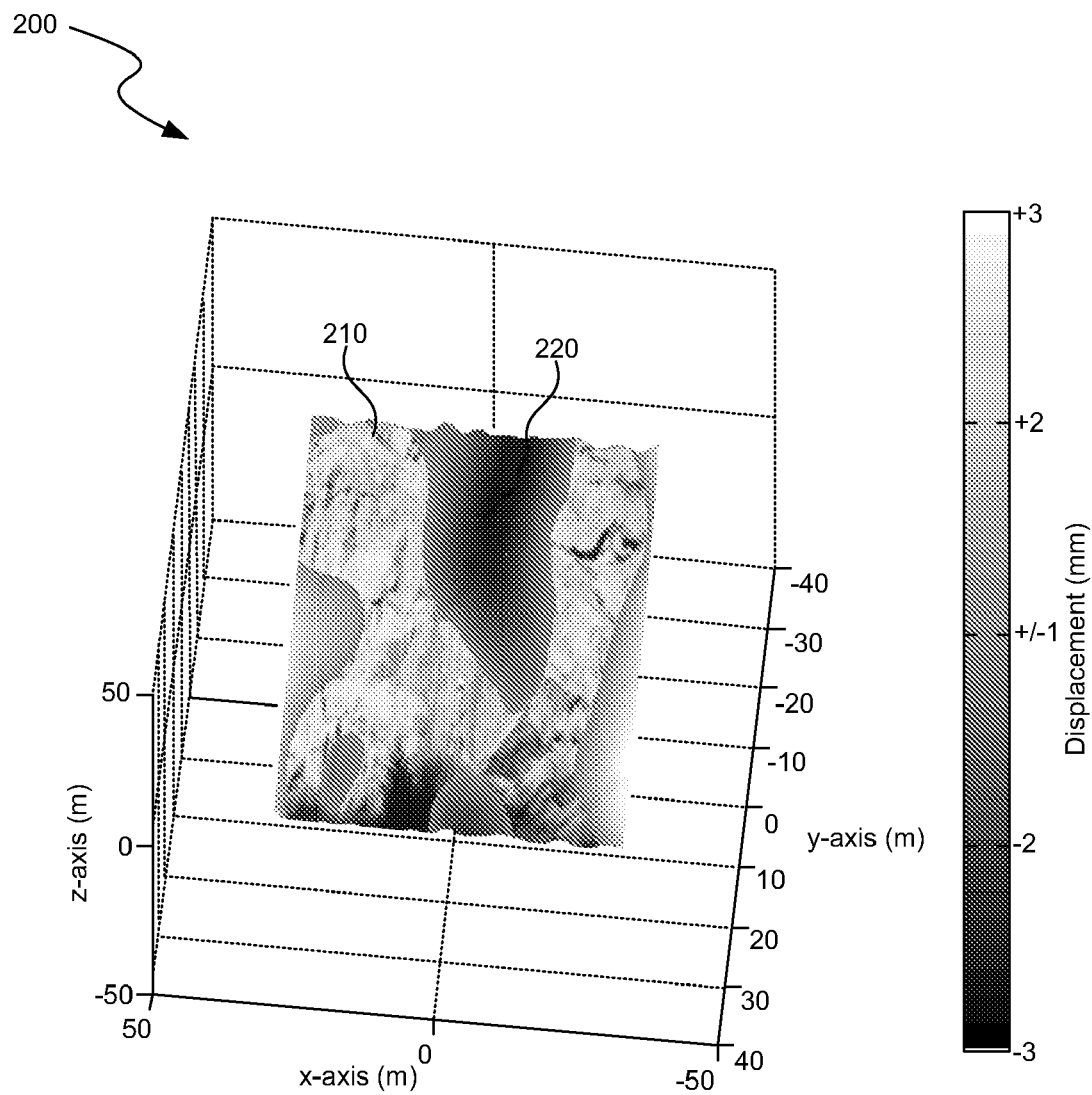
FIG. 2 is a display diagram that illustrates a display page produced by the stability monitoring system, in one embodiment.

FIG. 2 is a display diagram that illustrates a display page produced by the stability monitoring system, in one embodiment. The display page 200 includes an optical image 210 of the scene of interest with a displacement map 220 overlaid onto the optical image 210. The optical image 210 gives the operator a familiar frame of reference for interpreting the displacement map 220 that allows the operator to correlate the displacement map 220 with the physical scene that the operator sees. For example, if the displacement map 220 shows a region of particularly high displacement, the operator can look at the rock in front of him and correlate it with the optical image. The operator may then target that area for mitigation and flag it as a hazardous area for personnel that might later perform work on the rock.

Figure 3:
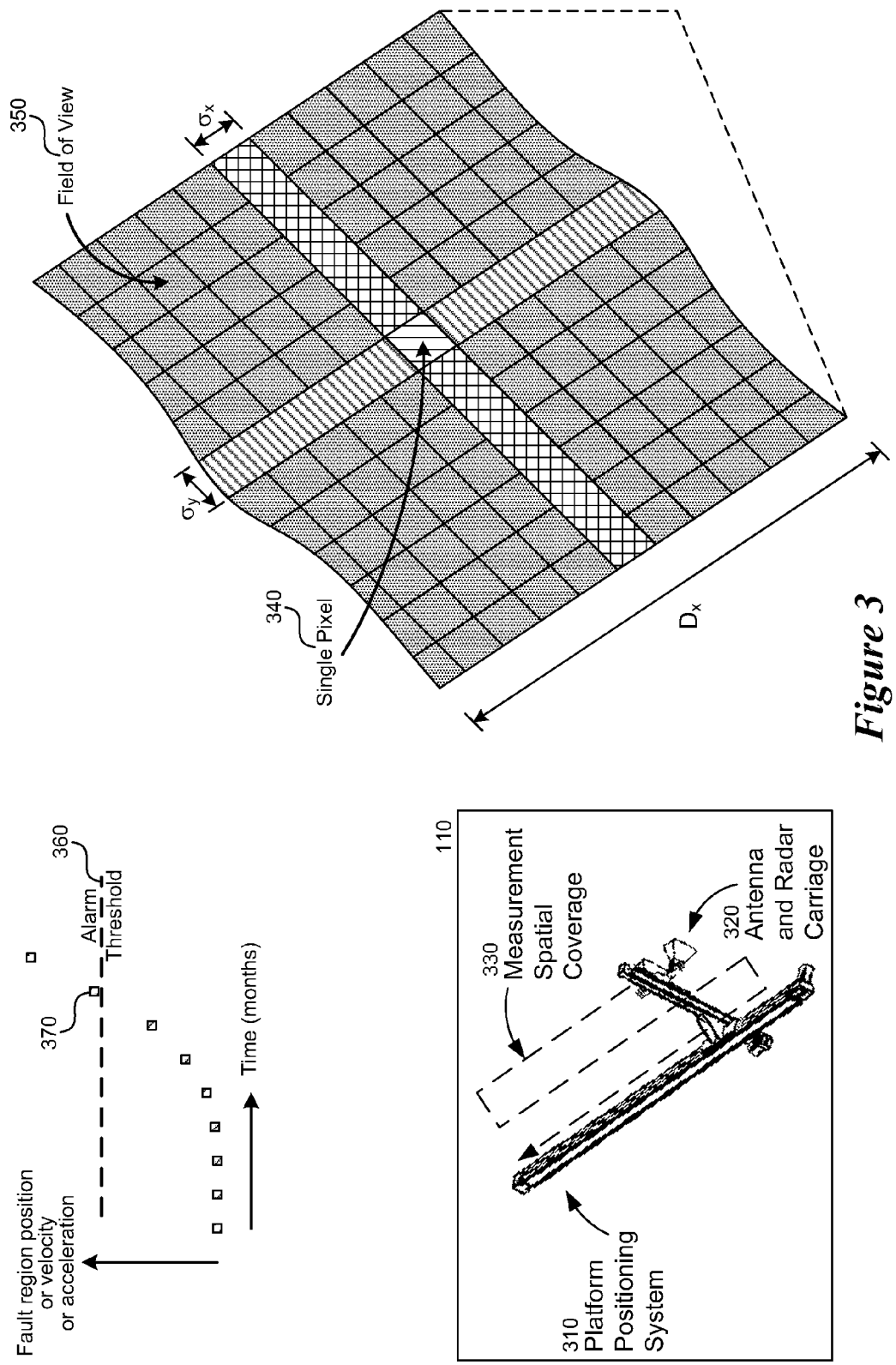
FIG. 3 is a block diagram that illustrates the operating environment of the stability monitoring system, in one embodiment.

FIG. 3 is a block diagram that illustrates the operating environment of the stability monitoring system, in one embodiment. The radar component 110 described herein captures information about a field of view 350 in a scene of interest, such as a cliff face or other geophysical object. An operator sets an alarm threshold 360 that indicates values of the data at which the operator wants to be notified. For example, if a particular region of the scene of interest moves by more than a threshold distance (e.g., a millimeter) in a threshold period (e.g., a month), then the system may notify the operator that the region is unstable. As the system collects data, when a data point 370 crosses the alarm threshold 360, the system notifies the operator. The alarm threshold 360 may include thresholds based on position, velocity, acceleration, or combinations of these.

The radar component includes a platform positioning component 310 and a radar carriage 320. The platform positioning component 310 provides the desired measurement spatial coverage 330 by moving the radar carriage 320, including one or more radar antennas, over an aperture to collect phase history data. The movement provided by the platform positioning component 310 allows the radar carriage 320 to capture information about each pixel 340 in the field of view 350 of the scene.

Those of ordinary skill in the art will recognize that a distinguishing characteristic of SAR with respect to the measurement spatial coverage 330 is that an equivalent real aperture would be twice the length in each dimension of the SAR due to the dual motion of the transmitter and receiver in SAR based techniques. For example, a 3-meter SAR produces the resolving power of a 6-meter real aperture. Additionally, because the SAR uses a small antenna to synthetically generate the aperture, arbitrarily large apertures can be formed that provide a multitude of benefits unrealizable with a real aperture. Thus, the stability monitoring system can be much more compact than other systems (e.g., mounted on a vehicle).

The platform positioning component 310 described herein can be physically embodied in a variety of forms. For example, in some embodiments (illustrated in FIG. 3), the platform positioning component 310 includes a two dimensional linear motion system (LMS). In the LMS, the platform position component 310 uses a set of motors and actuators to position the radar carriage 320 in the horizontal axis (x-axis) and the vertical axis (y-axis). The radar carriage 320 holds the radar antennas and the component 310 sweeps the carriage 320 across the two dimensional axes to collect raw phase history data that the data processing component forms into imagery using SAR processing. Alternatively or additionally, in some embodiments the platform position component 310 includes a vehicle-based platform with a vertical (y-axis) array of antennas. The vehicle drives along the horizontal axis (x-axis). In doing so, the component 310 sweeps the antennas across a horizontal axis forming multiple vertical baselines of horizontally collected data.

Figure 4:
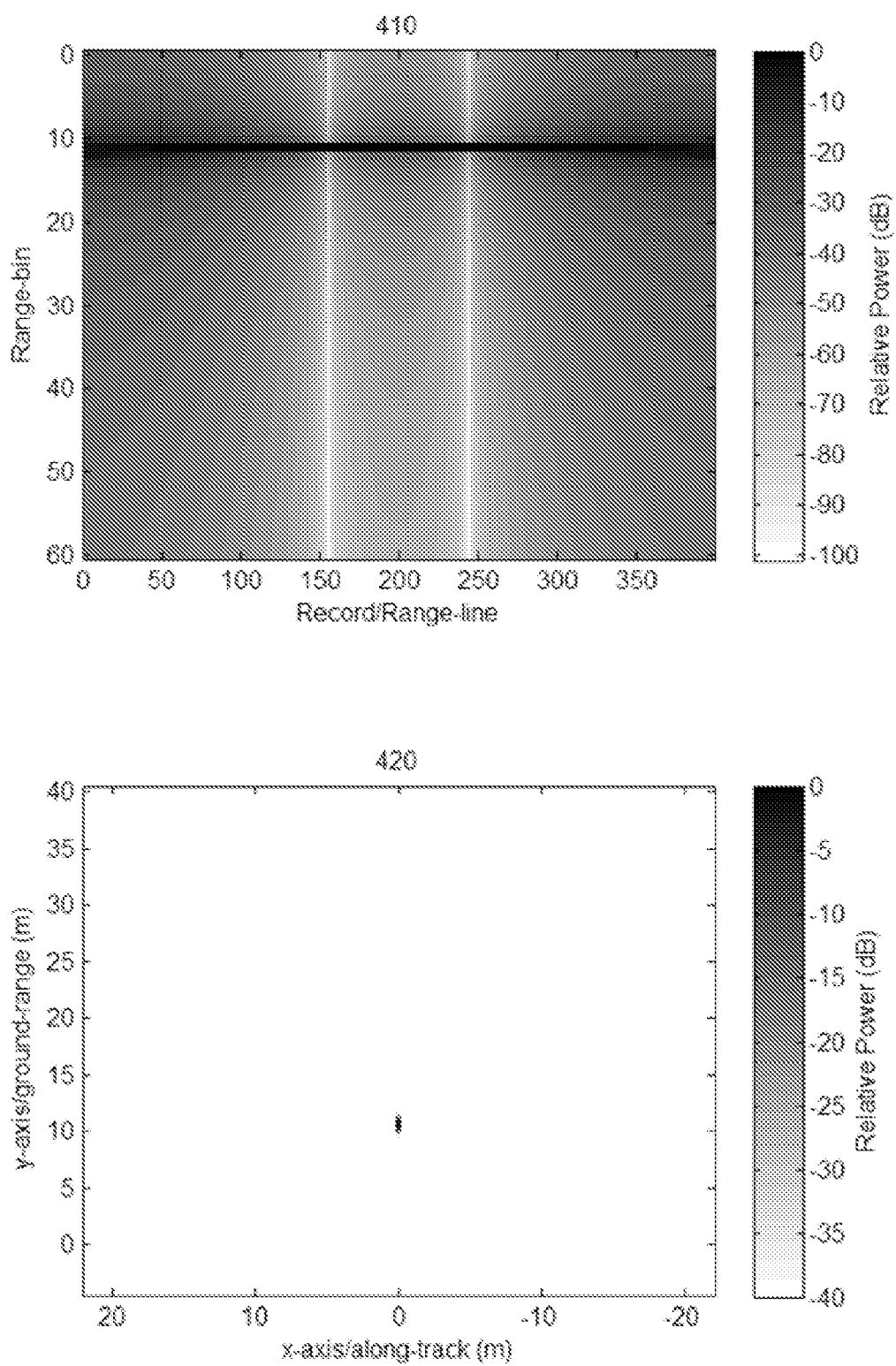
FIG. 4 illustrates a matched filter for a single pixel and the result of back projection processing for that pixel, in one embodiment.

FIG. 4 illustrates a matched filter for a single pixel and the result of back projection processing for that pixel, in one embodiment. The first diagram 410 illustrates the matched filter, and the second diagram 420 illustrates the result of back projection using the matched filter. The data processing component 130 described herein receives raw phase history and platform position data and forms SAR imagery. In some embodiments, the data processing component 130 uses a back projection algorithm to perform SAR processing, in part because of the possibility for 2D SAR apertures and wide viewing geometries. However, the system may use any of a number of suitable SAR algorithms. The back projection algorithm is an exact-matched filter implementation of the SAR processor under the Born approximation. In other words, no multipath, independent scatterers and no shadowing are assumed so that component can apply the principle of superposition and treat each pixel of the resulting image independently of other pixels.

In some embodiments, the stability monitoring system uses a 2D SAR aperture technique that provides a third resolving dimension. A problem specific to structure stability monitoring systems utilizing SAR is that the optimal system geometry may involve collecting data at near normal incidence. This introduces two problems that are insurmountable using traditional side-looking 1D SAR apertures. The first is layover in which the projection of the target (actual) surface onto the imaging surface causes two or more points on the target surface to project to the same point on the imaging surface. The second is poor range resolution because either: 1) the line of sight vector is perpendicular to the target surface, or 2) the Doppler bins from the SAR and the range bins are parallel rather than perpendicular. The stability monitoring system overcomes both of these problems at the same time using a 2D SAR aperture technique that provides a third resolving dimension.

Figure 5:
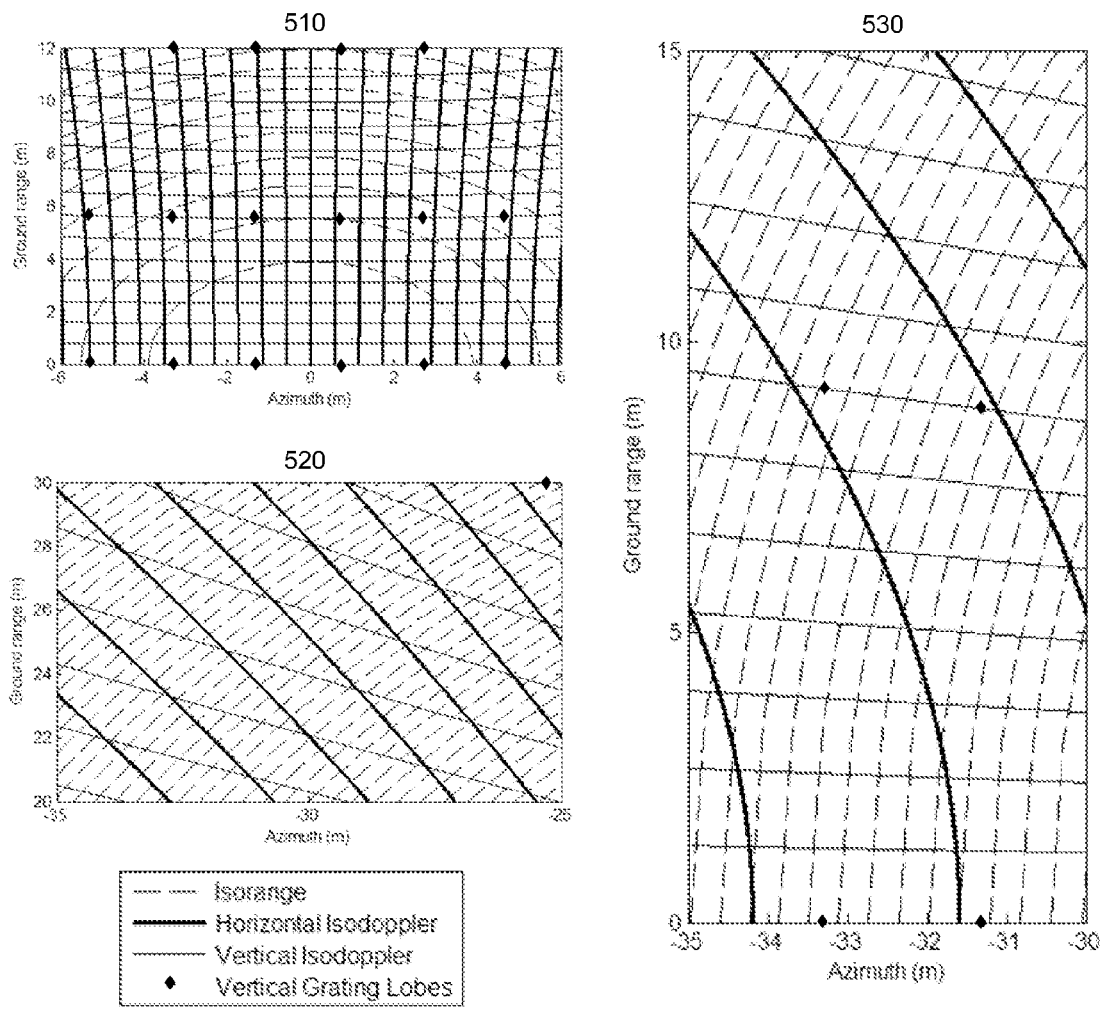
FIG. 5 illustrates isorange and isodoppler lines for a 2D SAR system operating perpendicular to a rock wall, in one embodiment.

FIG. 5 illustrates isorange and isodoppler lines for a 2D SAR system operating perpendicular to a rock wall, in one embodiment. The resolution of a radar system is often defined by its isorange and isodoppler lines. FIG. 5 includes three diagrams. In the diagrams, each isorange or isodoppler line is separated by one resolution cell, which is defined as the side lobe null spacing with boxcar windowed data. This is $c/2B \sin(\theta)$ for isorange lines where c is the speed of light, B is the RF bandwidth of the system, and $\theta$ is the local incidence angle. This is approximately $R\lambda/2L \cos^2 \phi$ for isodoppler lines where R is the range to the target, $\lambda$ is the wavelength, and L is the length of the aperture, and $\phi$ is the angle from broadside defined in the plane containing the aperture and the target. In FIG. 5, broadside of the SAR aperture is position zero on the rock wall. These plots show how 2D SAR can provide the desired resolution.

In diagram 510, the range resolution is poor due to the line of sight being perpendicular to the rock wall. In diagram 530, the range bins and horizontal Doppler bins align so that there is no vertical resolution. In both diagram 510 and diagram 530, the vertical isodoppler lines solve the resolution problem. Since a 2D aperture provides an effective pencil-beam radiation pattern after processing, the layover-projection problem is solved since the target is resolved in three dimensions. Thus, multiple targets in 3D space cannot project onto the same spot in the image space.

In some embodiments, the stability monitoring system achieves this resolving capability with a sparse dataset. Because of the time required to fully sample a 2D SAR aperture, the system may sparsely sample the vertical axis so that the measurement time can be reduced. The downside of doing this is that this introduces grating lobes into the SAR processor output. That is, two targets can have the same vertical isodoppler that would otherwise have been separable if the axis had been fully Nyquist sampled. The diagrams in FIG. 5 illustrate the positions of the grating lobes for a broadside target using an undersampling of ten times. By adjusting the vertical sample spacing properly, the stability monitoring system can achieve the undersampling that improves the measurement time without suffering the bad effects of the grating lobes. This is done by coupling the vertical isodoppler with another resolving technique. In the case of diagram 510, the grating lobes are placed a minimum of two isorange lines apart. This way range resolution fills in when the vertical isodoppler resolving power breaks down.

Figure 6:
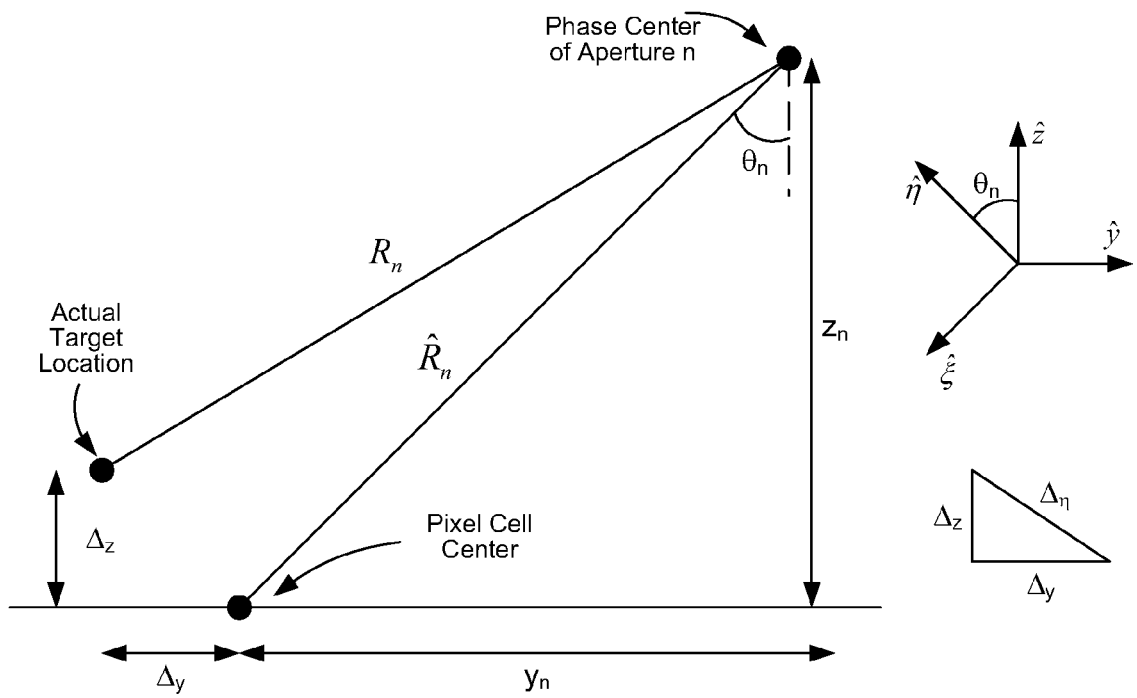
FIG. 6 is a geometric diagram that illustrates InSAR processing performed by the data processing component, in one embodiment.
Figure 6:
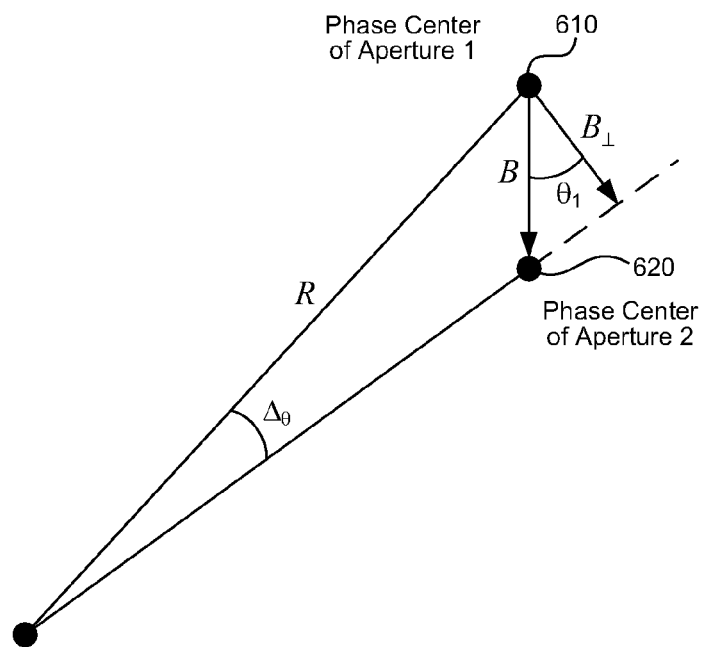

FIG. 6 is a geometric diagram that illustrates InSAR processing performed by the data processing component, in one embodiment. InSAR techniques provide two data products within the system. The first is a DEM and the second is a vector displacement map. Depending on the number of temporal baselines used, the vector displacement map can be a vector with one to three elements. If only a single temporal baseline is used, then the displacement vector has one element and is more aptly called a scalar displacement map. The system described herein is capable of producing a full 3D vector depending on the time and system geometries available.

A measurement set refers to a collection of data taken at one time instance. The surface is assumed to be moving slowly enough that it is stationary during the data collection time for a single measurement set. A measurement set is nominally comprised of multiple horizontal 1D SAR apertures with vertical baselines.

The system uses InSAR within a single measurement set with multiple baselines to produce a DEM. By its nature, one-dimensional SAR provides a two-dimensional image of a three-dimensional scene. All the targets in the third dimension are integrated together into the two-dimensional image in a tomographic-like projection. When the three-dimensional scene is a surface, a pair of SAR images can be interfered in such a way that the three-dimensional surface may be reconstructed. The system considers each pixel separately based on the Born approximation. If there are N different 1D SAR apertures then the system has a set of N measurements of a pixel from N phase centers. By comparing the N pixel phases from each of the N phase centers, the system can determine the actual target location. Considering data from phase center 610 and 620, let the difference between the target's two phase estimates be defined as $\Delta_\psi = \Delta_\eta \Delta_\theta$. The height above the surface along the $\eta$ axis is found with $$\Delta_\eta = \frac{R\Delta_\psi}{2kB_\perp}$$

where $$k = \frac{2\pi}{\lambda}$$

is the wave number of the medium.

Figure 7:
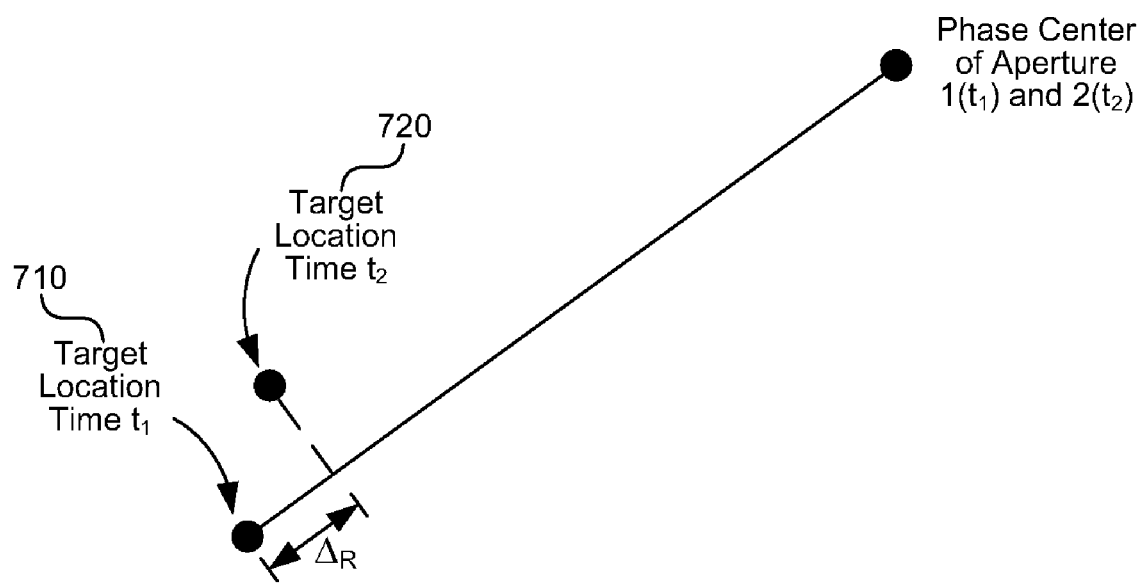
FIG. 7 is a geometric diagram that illustrates the location of a target location over time as measured by the stability monitoring system, in one embodiment.

FIG. 7 is a geometric diagram that illustrates the location of a target location over time as measured by the stability monitoring system, in one embodiment. In some embodiments, the stability monitoring system uses Differential InSAR (DInSAR) to generate the displacement maps. The system produces DInSAR data by comparing two separate measurement sets separated by a temporal baseline. That is, the first measurement set is taken at time $t_1$ 710. The second measurement set is taken at time $t_2$ 720 where $t_2$ is a later time. The range displacement is related to the phase difference by $$\Delta_R = \frac{\Delta_\psi}{2k}$$

where $\Delta_\psi$ is the target's phase difference between two collocated apertures separated by a temporal baseline.

Figure 8:
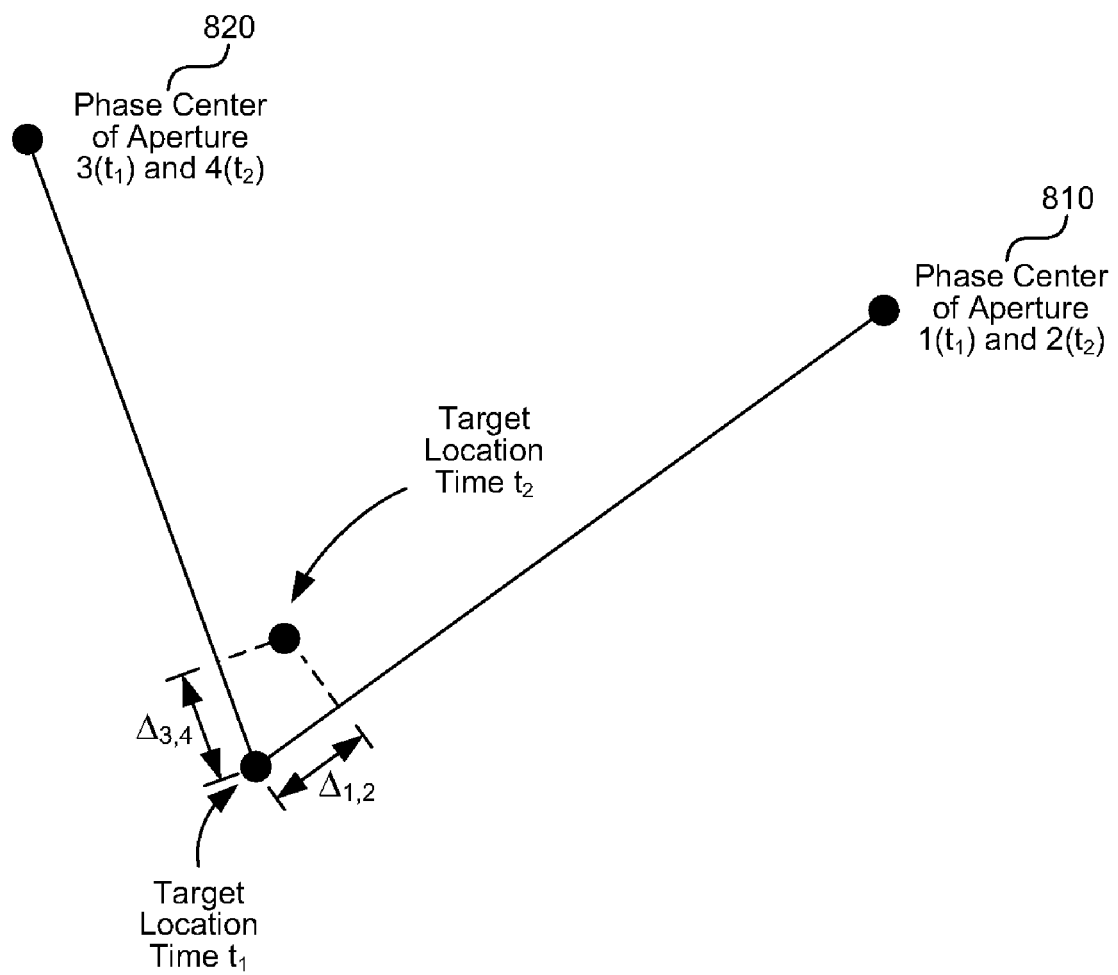
FIG. 8 is a geometric diagram that illustrates a multi-baseline DInSAR approach for measuring a target location, in one embodiment.

FIG. 8 is a geometric diagram that illustrates a multi-baseline DInSAR approach for measuring a target location, in one embodiment. The diagram illustrates the measurement of a target location from a first phase center 810 and a second phase center 820. The multi-baseline DInSAR approach gives a form of spatial diversity that provides two robustness advantages over single baseline DInSAR. The first is that random coherence dropouts will have affected each possible pairing of images from the first measurement set and the second measurement set in different ways. By performing a weighted average to determine the phase estimate according to the coherence estimation on each pair, the system improves the phase estimate. For illustration, a simple weighting scheme keeps high coherence phase estimates and discards low coherence (i.e. poor) estimates. The second advantage is a natural outcome of the technique described to achieve the first advantage, in that multiple independent phase estimates are averaged together to improve the final phase estimate (i.e. even if the phase estimates are all good or all bad, they are still improved after additional averaging of independent looks).

Another benefit of multi-baseline DInSAR data is the possibility to produce a vector displacement map if the spatial baselines within each measurement set are sufficiently large. Each pair of SAR images produces a displacement map. If the system takes the SAR image pairs from different look angles, the system can transform the various displacement measurements through pseudo-inverse techniques (maximum likelihood estimator) into a vector displacement map. The system may also use other estimation methods, such as the minimum mean squared error estimator.

The stability monitoring system can also use a polarimetric DInSAR (PoIDInsar) method in a way that is similar to the multi-baseline DInSAR. By collecting data in HH and VV polarizations, the system has two sets of independent phase estimates that allow an additional level of weighted averaging based on the coherence estimates.

In some embodiments, the stability monitoring system performs special handling of obstacles, such as vegetation and vehicular traffic, which may be included in measurements of a scene of interest. The system uses target classification to remove vegetated and other incoherent areas from the analysis and/or flag them as areas that are prone to large displacement errors. The system may also use adaptive region-growing techniques (such as intensity-driven adaptive-neighborhood (IDAN)-based speckle filtering) to improve phase estimates. The system may modify these region-growing techniques to include geophysical models of faults so that the techniques grow most easily along expected fault boundaries and shape profiles. The fault detection component may use a combination of user input, pattern recognition, and geophysical knowledge to identify regions in post-interferometric processing.

In addition, the system may use vehicle detection and extraction to remove vehicular traffic signatures from the dataset before SAR processing when such interference would otherwise create aberrations in the SAR imagery. This is possible using a pulsed radar system and a range-dependent detection threshold. The threshold mechanism detects the presence of a large radar cross section and then sets the associated range bins to zero (or some smaller value). The method takes advantage of the large radar cross section of the vehicles relative to the backscatter from the scene. Target detection may be improved using data from previous range lines and/or multiple along-track receivers.

Figure 9:
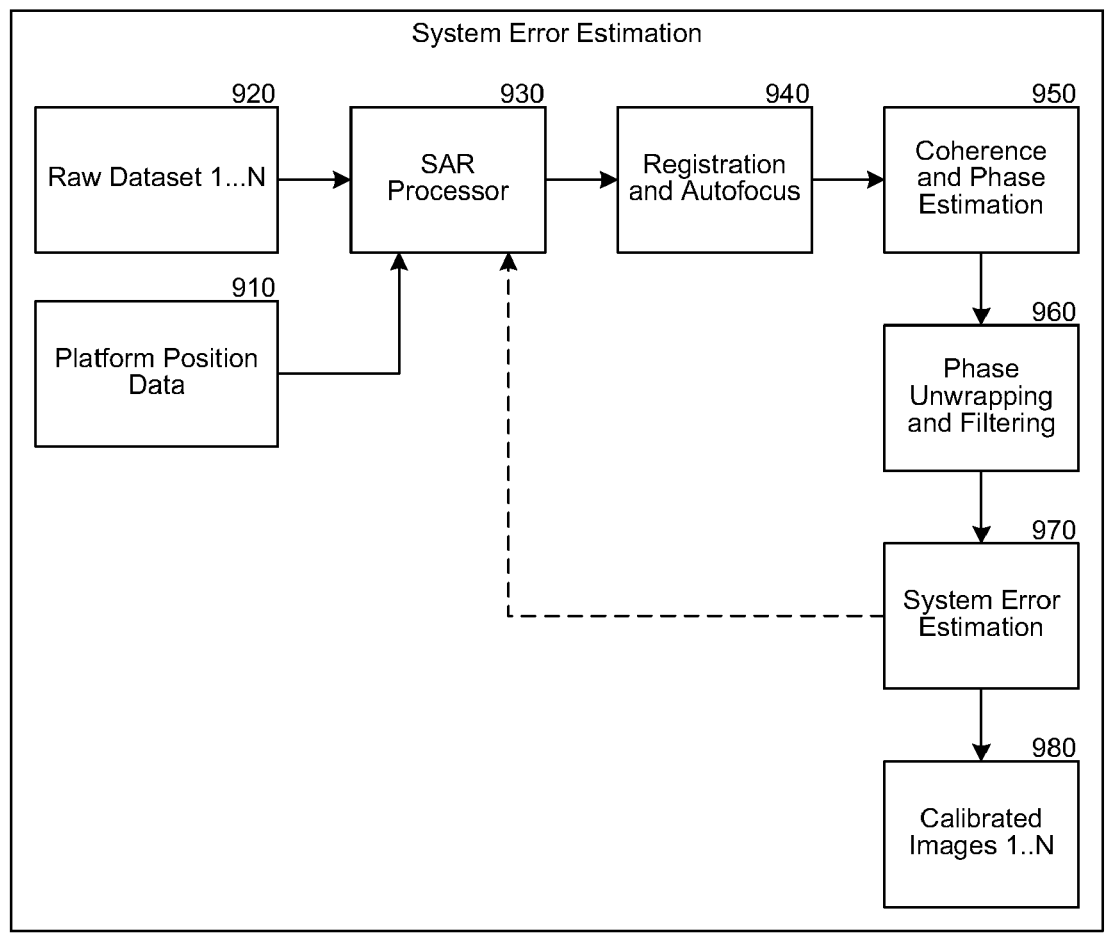
FIG. 9 is a block diagram that illustrates the error estimation process used by the system, in one embodiment.

FIG. 9 is a block diagram that illustrates the error estimation process used by the system, in one embodiment. To provide highly accurate displacement maps, the system should accurately calibrate the interferograms. The error estimation process helps to realize the potential to reposition the system over long time intervals. Two aspects of the error estimation process are: 1) estimating the positional, atmospheric, and hardware variations through analysis of the interferograms (especially the phase) and their distinctive signatures relative to faults, and 2) iterating the estimation to achieve improved results. The SAR processor 930 receives raw phase history data 920 and platform position data 910 and creates SAR imagery. The SAR processor 930 may perform spectral filtering when considering the DEM and spatial baseline decorrelation.

The registration and autofocus component 940 performs automatic focusing of the SAR images, which also independently improve platform position information. The registration and autofocus component 940 also pairs and registers the SAR images so that the images can be interfered. The coherence and phase estimation component 950 performs coherence and phase estimation of the registered pairs of images. After the component makes initial mod-$2\pi$ phase estimates, the phase unwrapping and filtering component 960 filters and unwraps the phase of the interferogram. The system error estimation component 970 considers all pairs of unwrapped phase and positional data to generate a system error map and confidence rating. The system error estimation component 970 can use reference reflectors whether unintentional (as in permanent scatterers or coherent target monitoring) or intentional (as in operator installed reflectors) to improve the results. The map is translated into effective position errors that can be fed back to the SAR processor 930 to reiterate the whole procedure. Once the confidence rating is acceptable to the user, the system provides calibrated displacement images 980.

Figure 10:
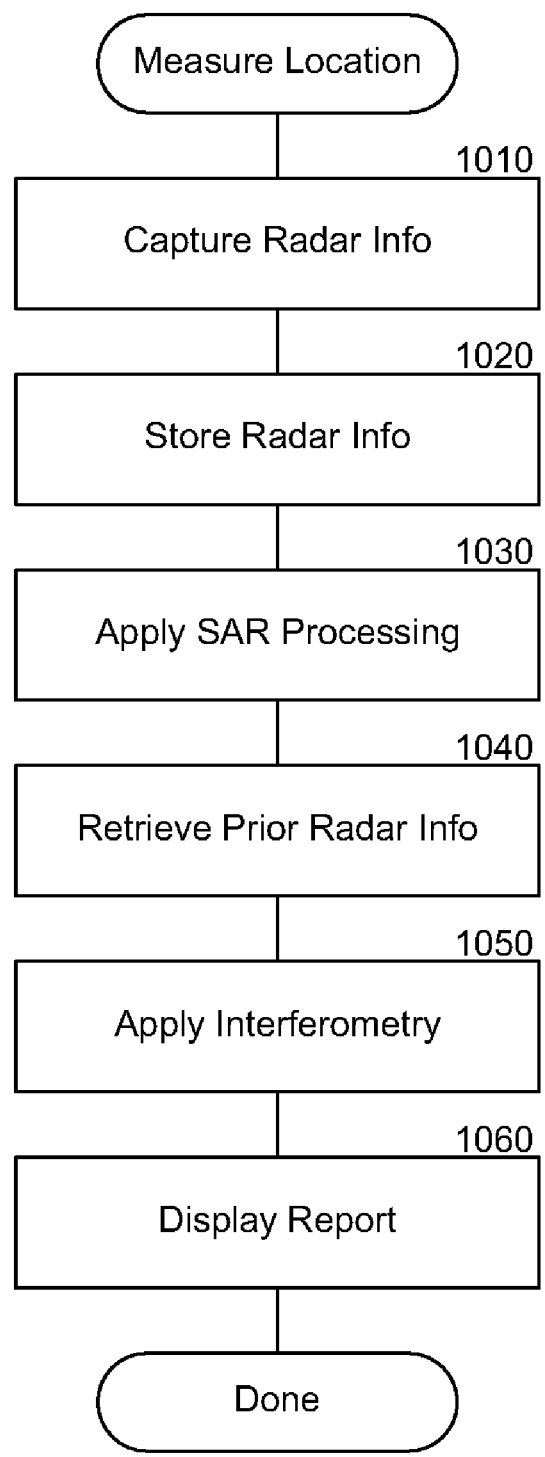
FIG. 10 is a flow diagram that illustrates the processing of the system to measure displacements at a particular location, in one embodiment.

FIG. 10 is a flow diagram that illustrates the processing of the system to measure displacements at a particular location, in one embodiment. In block 1010, the system captures radar information about the location. For example, the system may use the platform positioning component described herein to sweep a radar antenna over a specified range. In block 1020, the system stores the captured radar information in the geophysical data store for later use, such as for comparison with later radar information. In block 1030, the system applies SAR processing to the radar information to produce one or more SAR images. In block 1040, the system retrieves prior radar information from the geophysical data store. For example, transportation authorities may use the system to perform measurements at regular (e.g., monthly) intervals. In block 1050, the system applies interferometry to the captured radar information from the current measurement interval and retrieved prior radar information to produce an interference map indicative of movement at the location over time. In block 1060, the system displays a report to an operator of the system. For example, the system may display the interference map overlaid with an optical image of the location. After block 1060, these steps conclude.

Figure 11:
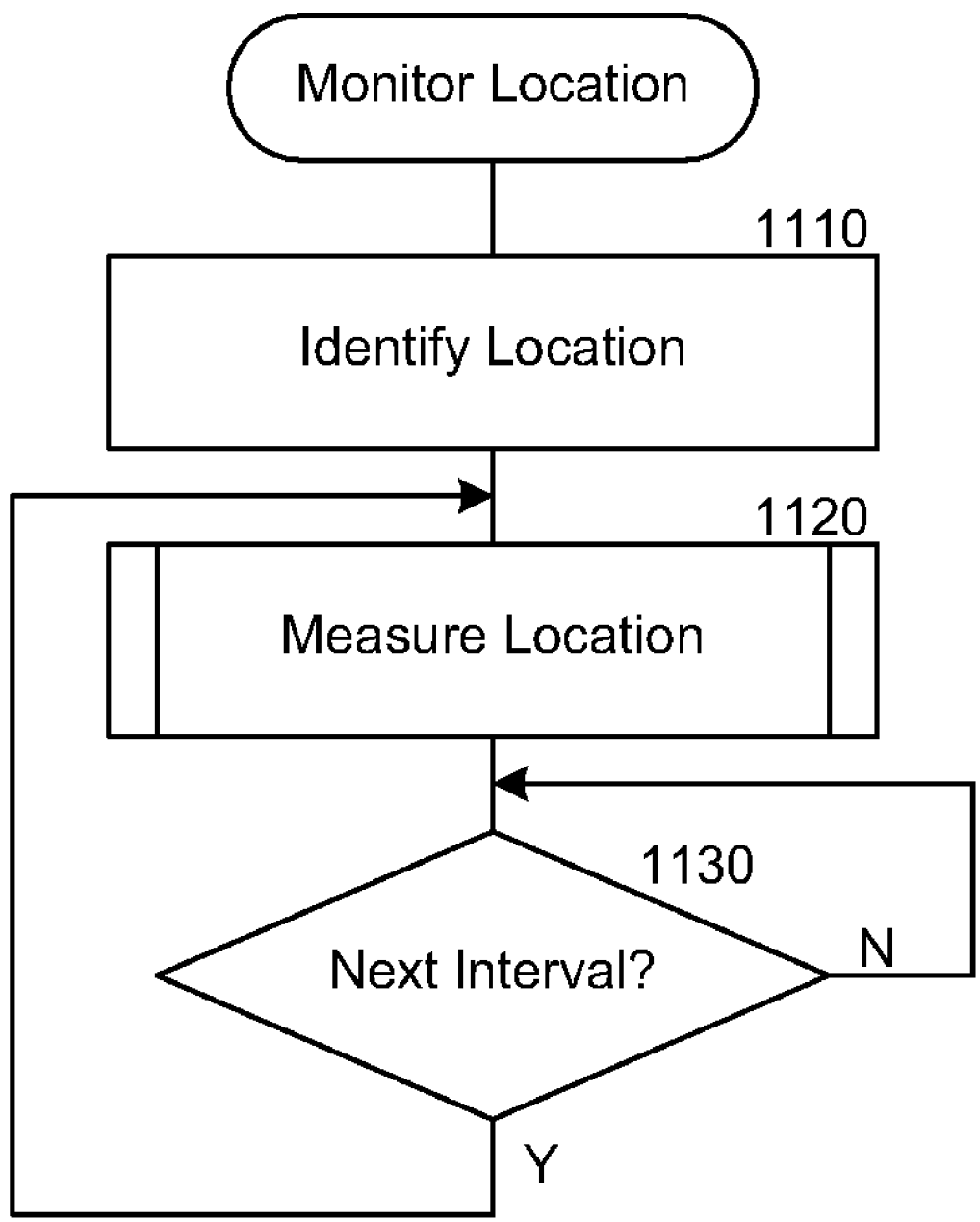
FIG. 11 is a flow diagram that illustrates the overall processing of the system to monitor a location over time, in one embodiment.

FIG. 11 is a flow diagram that illustrates the overall processing of the system to monitor a location over time, in one embodiment. In block 1110, the system identifies a location. For example, the operator may indicate the current location of the system or the system may use various techniques, such as detecting a survey marker, to automatically determine the current location of the system. In block 1120, the system takes measurements at the location as further illustrated in FIG. 10. In decision block 1030, the system waits until it is time for the next measurement interval. If it is time for the next measurement interval, then the system loops to block 1120 to take measurements at the location for the current interval, else the component loops to block 1130 to wait for the appropriate time. The system may be mounted at the location for an extended period, or may be moved around frequently such that the equipment is available for use at another location while waiting for the next measurement interval at the current location.

From the foregoing, it will be appreciated that specific embodiments of the stability monitoring system have been described herein for purposes of illustration, but that various modifications may be made without deviating from the spirit and scope of the invention. For example, although rock and other geophysical movement have been described, the system could be applied to monitoring many different types of movement over time, including snowpack (e.g., potentially leading to avalanches), glacial movement, dam stability, mines, erosion, and so forth. Accordingly, the invention is not limited except as by the appended claims.

We claim:

1. A computer-implemented method for monitoring a geographic slope, capable of detecting small surface displacements using intermittent measurement intervals spread over an extended period, the method comprising:

at a current measurement interval, capturing ground-based radar information associated with the geographic slope by pointing a mobile radar device on or near the ground in the direction of the geographic slope;

applying synthetic aperture radar processing to the radar information to produce one or more synthetic aperture radar images;

retrieving radar information associated with the slope from a previous measurement interval;

applying interferometry to the captured radar information from the current measurement interval and retrieved radar information from the previous measurement interval to produce a vector displacement map indicative of movement of the slope over time; and displaying the vector displacement map to an operator.

2. The method of claim 1 wherein capturing radar information comprises sparsely sampling the radar return from the slope to reduce the measuring time.

3. The method of claim 1 further comprising applying target classification to detect and remove errors in the radar information.

4. The method of claim 1 further comprising performing adaptive region-growing to detect and improve faults in the radar information.

5. The method of claim 1 wherein applying synthetic aperture radar processing comprises applying interferometric synthetic aperture radar processing to generate a digital elevation model of the slope.

6. The method of claim 5 wherein applying interferometric synthetic aperture radar processing comprises performing at least one of multi-baseline differential interferometric synthetic aperture radar and polarimetric differential interferometric synthetic aperture radar to improve robustness.

7. The method of claim 1 wherein applying synthetic aperture radar processing and interferometry comprise applying an iterative process that feeds data processing results back to improve measurement accuracy.

8. The method of claim 1 further comprising calibrating the synthetic aperture radar images to account for differences in a measurement location of the current measurement interval and a measurement location of the previous measurement interval.

9. The method of claim 1 further comprising overlaying a displacement map onto an optical image of the slope that is draped on a digital elevation model and displaying the result to the operator.

10. A computer system for monitoring movement of a geophysical region over time, the system comprising:

a radar component configured to collect ground-based radar information about the geophysical region by pointing a mobile radar device on or near the ground in the direction of the geophysical region;

a geophysical data store configured to store information about the geophysical region, wherein the stored information includes previously collected radar information;

a data processing component configured to process the collected radar information and previously collected radar information to detect movements in the geophysical region; and a user interface component configured to report results of the data processing component to an operator of the system.

11. The system of claim 10 wherein the radar component is a ground-based synthetic aperture radar operating from a mobile platform with two-dimensional scan capability.

12. The system of claim 10 wherein the data processing component is further configured to employ interferometric synthetic aperture radar and differential interferometric synthetic aperture radar processing to measure surface displacements of the geophysical region with high resolution.

13. The system of claim 10 wherein the system is configured to be re-deployed between measurement intervals to allow the system to be used across multiple geophysical regions.

14. The system of claim 10 further comprising an optical component configured to collect optical information about the geophysical region and wherein the data processing component is further configured to overlay the collected radar information on the collected optical information.

15. The system of claim 10 further comprising a calibration component configured to calibrate the system using reflective targets.

16. The system of claim 10 wherein the user interface component is further configured to receive an alarm threshold from the operator that indicates a threshold of movement for which the operator requests notification.

17. A computer-readable medium encoded with instructions for controlling a computer system to display movement of a rock wall, by a method comprising:
identifying a geographic location for placing a ground-based, mobile synthetic aperture radar device, wherein the geographic location has a possibility of rock fall;
performing a series of radar scans of the geographic location from the ground-based, mobile synthetic aperture radar device by pointing the radar device on or near the ground in the direction of the geographic location;
storing information associated with the series of radar scans in a data store;
after a period over which the location may have changed, performing a second series of radar scans of the location;
comparing the first series of radar scans with the second series of radar scans to identify movement indicative of a potential rock fall; and
displaying results associated with the identified movement.

18. The computer-readable medium of claim 17 wherein performing a series of radar scans does not include using pre-placed reflective targets.

19. The computer-readable medium of claim 17 further comprising for any identified movement, determining the rate of acceleration of the movement based on multiple series of radar scans.

20. The computer-readable medium of claim 17 further comprising, if movement indicative of a potential rock fall is identified, notifying an operator to schedule mitigation of the potential rock fall.

* * * * *